United States Patent
Tian et al.

(10) Patent No.: US 9,338,461 B2
(45) Date of Patent: May 10, 2016

(54) METHOD AND SYSTEM FOR ENCODING COLLECTIONS OF IMAGES AND VIDEOS

(71) Applicant: Mitsubishi Electric Research Laboratories, Inc, Cambridge, MA (US)

(72) Inventors: Dong Tian, Boxborough, MA (US); Anthony Vetro, Arlington, MA (US); Shantanu Rane, Cambridge, MA (US)

(73) Assignee: MITSUBISHI ELECTRIC RESEARCH LABORATORIES, INC, Cambridge, MA (US)

( * ) Notice: Subject to any disclaimer, the term of this patent is extended or adjusted under 35 U.S.C. 154(b) by 425 days.

(21) Appl. No.: 13/758,348

(22) Filed: Feb. 4, 2013

(65) Prior Publication Data

US 2014/0219330 A1     Aug. 7, 2014

(51) Int. Cl.
*H04N 7/12*         (2006.01)
*H04N 11/02*        (2006.01)
*H04N 11/04*        (2006.01)
*H04N 19/134*       (2014.01)
*H04N 19/54*        (2014.01)
*H04N 19/573*       (2014.01)

(52) U.S. Cl.
CPC ............. *H04N 19/134* (2014.11); *H04N 19/54* (2014.11); *H04N 19/573* (2014.11)

(58) Field of Classification Search
CPC ...................................................... H04N 19/134
USPC ........................................ 375/240.01–240.29
See application file for complete search history.

(56) References Cited

U.S. PATENT DOCUMENTS

| | | | |
|---|---|---|---|
| 2005/0243921 A1* | 11/2005 | Au et al. ................. | 375/240.12 |
| 2005/0243928 A1* | 11/2005 | Hubrich et al. .......... | 375/240.16 |
| 2008/0175491 A1* | 7/2008 | Kondo ......................... | 382/232 |
| 2009/0175343 A1* | 7/2009 | Pearlstein ................ | 375/240.16 |
| 2011/0103480 A1* | 5/2011 | Dane ......................... | 375/240.16 |
| 2011/0299770 A1* | 12/2011 | Vaddadi et al. ............. | 382/165 |
| 2012/0002725 A1* | 1/2012 | Kazui ...................... | 375/240.12 |

OTHER PUBLICATIONS

Guillaume Laroche, Joel Jung, and Beatrice Pesquet-Popescu, RD Optimized Coding for Motion Vector Predictor Selection, IEEE Transactions on Circuits and Systems for Video Technology, vol. 18, No. 9, Sep. 2008.*

* cited by examiner

*Primary Examiner* — Chikaodili E Anyikire
(74) *Attorney, Agent, or Firm* — Gennadiy Vinokur; James McAleenan; Hironori Tsukamoto

(57) ABSTRACT

An input segment of an input video is encoded by first extracting and storing, for each segment of previously encoded videos, a set of reference features. The set of input features are matched with each set of the reference features to produce a set of scores. The reference segments having largest scores are selected to produce a first reduced set of reference segments. A rate-distortion cost for each reference segment in the first reduced set of reference segments is estimated. The reference segments in the first reduced set of reference segments is selected to produce a second reduced set of reference segments. Then, the input segment are encoded based on second reduced set of reference segments.

14 Claims, 3 Drawing Sheets

300

METHOD AND SYSTEM FOR ENCODING COLLECTIONS OF IMAGES AND VIDEOS

FIELD OF THE INVENTION

This invention relates generally to encoding collections of images and videos, and more particularly to encoding images or segments of video programs using previously encoded images or segments of other similar video programs.

BACKGROUND OF THE INVENTION

The amount of image and video content that is being created and distributed on a daily basis is staggering and continuing to increase. This growth is being driven not only by professional content production, but also due to the wide availability of low cost video cameras and network distribution services.

Conventional image and video coding techniques such as JPEG (Joint Photographic Experts Group, H.264/MPEG-4 (Moving Picture Experts Group) Part 10 or AVC (Advanced Video Coding), and its successor High Efficiency Video Coding (HEVC), are used to encode the image and video content to reduce bit rate and storage requirements. While substantial improvements in encoding efficiency have been realized using conventional prediction and transform coding techniques applied to the image or video to be coded, the resolution of digital still picture cameras and video cameras continues to improve, demanding increased storage and bit rate requirements.

As defined herein, a video is recorded program of related scenes or segments. An image may be considered a subset of the video and will be referred to as a segment.

In consumer electronic devices, it is common to store multiple videos and collections of images. This type of storage provides the benefit of being able to view a particular image or video at the convenience of the consumer. It is easy to accumulate a large number of images and videos. Similarly, servers that are used for online streaming store massive amounts of images and videos to download and view. There are also very large storage requirements for video surveillance systems in which multiple video cameras continuously acquire videos of usually repetitive scenes.

A video series refers to a collection of video programs that unfold in a sequential episode-by-episode manner. A video series can span entire TV seasons or even decades. Worldwide, the "soap opera" is the most prominent form of a video series. Video series also tend to be highly repetitive in terms of scene content.

Therefore, there is a need improve the encoding of collections of images and videos.

SUMMARY OF THE INVENTION

An input segment of an input video is encoded by first extracting and storing, for each segment of previously encoded videos, a set of reference features. The set of input features are matched with each set of the reference features to produce a set of scores. The reference segments having largest scores are selected to produce a first reduced set of reference segments. A rate-distortion cost for each reference segment in the first reduced set of reference segments is estimated. The reference segments in the first reduced set of reference segments is selected to produce a second reduced set of reference segments. Then, the input segment are encoded based on second reduced set of reference segments.

DETAILED DESCRIPTION OF THE PREFERRED EMBODIMENTS

The embodiments of our invention provide a method and system for encoding collections of images and videos. The term inter-program video encoding is used to refer to this process. As used herein encoding addresses both data reduction (compression or reduced storage requirement in the spatial domain) and bandwidth reduction (data transfer rate and reduced time requirements in a temporal domain), while concurrently minimizing distortion when the images a ad videos are decoded and viewed.

In one embodiment, sets of reference features are extracted and stored for each segment of previously encoded programs, images or videos. The segments can correspond to a single image or scenes in the program. As a characteristic of the invention, the segments can be repetitive and similar to each other in terms of their signal properties. The sets of reference features are used to predictively encode segments of new input images and videos. The embodiments leverage existing components that achieve inter-view prediction for multiview video coding (MVC).

Our invention is based, in part, on the realization that in many serial video programs, such as soap operas, situation comedies, game shows, cartoon and the like, scenes, objects, characters, colors, camera views, etc, tend to be highly repetitive in both the spatial and temporal domains. The same observation is made for collections of images or subsets of the collections.

Figure 1:
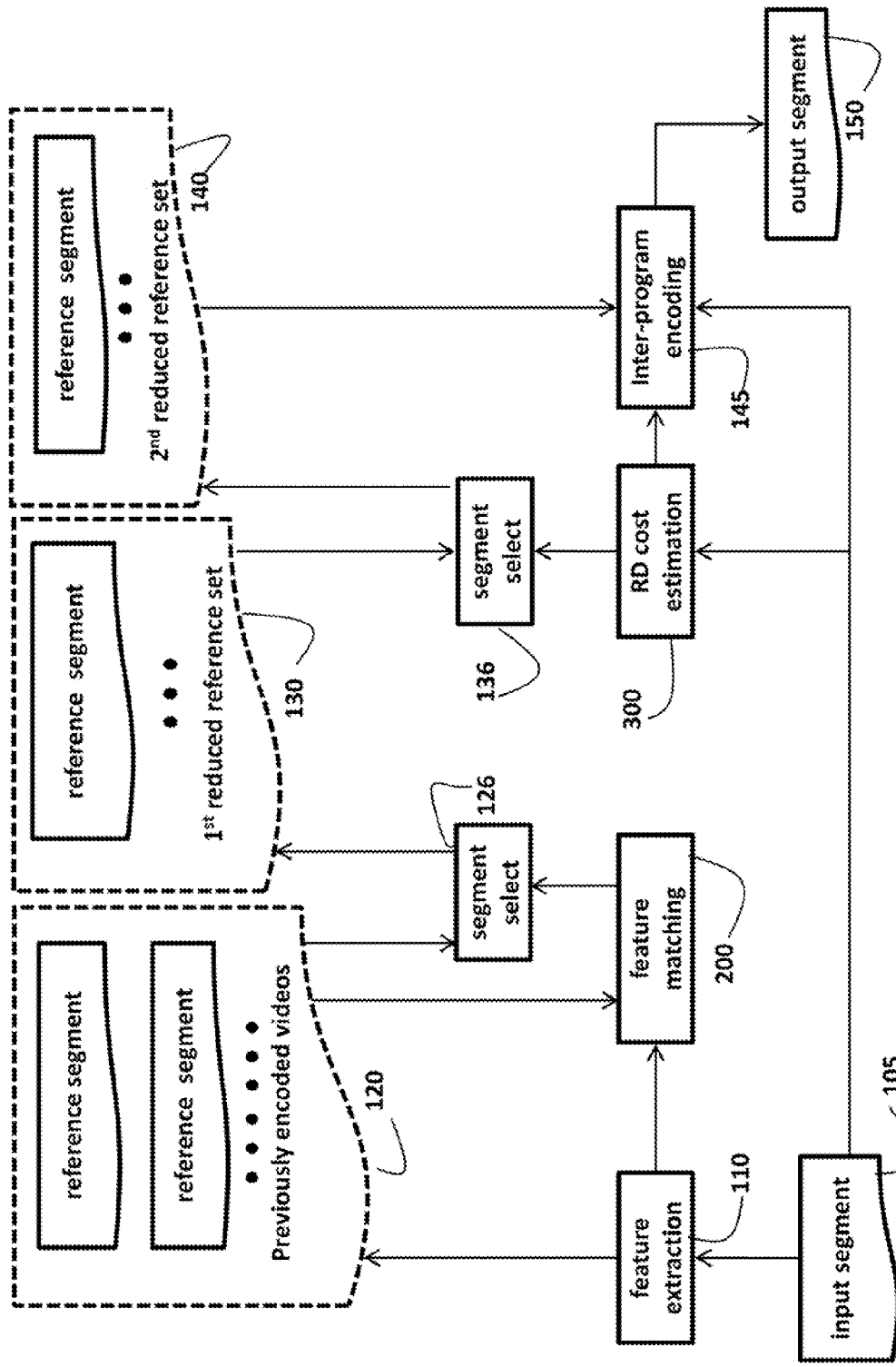
FIG. 1 is a flow diagram of a method for inter-program encoding according to embodiments of the invention.

FIG. 1 shows the method according to the embodiments of our invention. An input segment 105 is encoded to produce an output segment 150. The output segment is a compressed version of the input segment having reduced storage and bit rate requirements. The encoding uses reference segments 120 of previously encoded images or video programs.

A set of input feature are extracted 110 from the input segment. The set of input features can be in the form of feature descriptions or feature vectors as described below. The features of the input segment are matched 200 with the sets of reference features in the reference segments 120 to produce a set of scores. The results of the feature matching are used to select 126 segments to produce a $1^{st}$ reduced reference set 130. This process can be considered a coarse matching.

Next, rate-distortion (RD) cost estimation 300 is performed on the input segment and the $1^{st}$ reduced reference set 130. The smallest RD costs are used to select 136 segments from the $1^{st}$ reduced reference set 130 to produce a $2^{nd}$ reduced reference set of reference segments 140.

Then, pictures in the $2^{nd}$ set of reference segments 140 are used as part of the inter-program encoding 145 to produce the output segment 150. The output segment 150 and features can be stored with the previously encoded segments 120 to encode new images or videos.

To achieve an optimal coding efficiency, we identify a picture, or a group of pictures (GOP), from the previously encoded segments that is highly correlated with the pictures in the input segment 105. We describe a technique for reference picture selection that leverages feature matching as a coarse matching 200 to rapidly and efficiently select the optimal reference segments in a large set of candidate reference segments.

The RD costs estimation is a fine matching process to identify the reference segments that have the optimal encoding efficiency considering inter-program prediction and encoding. These processes are described in further detail below.

Feature Extraction and Matching

Figure 2:
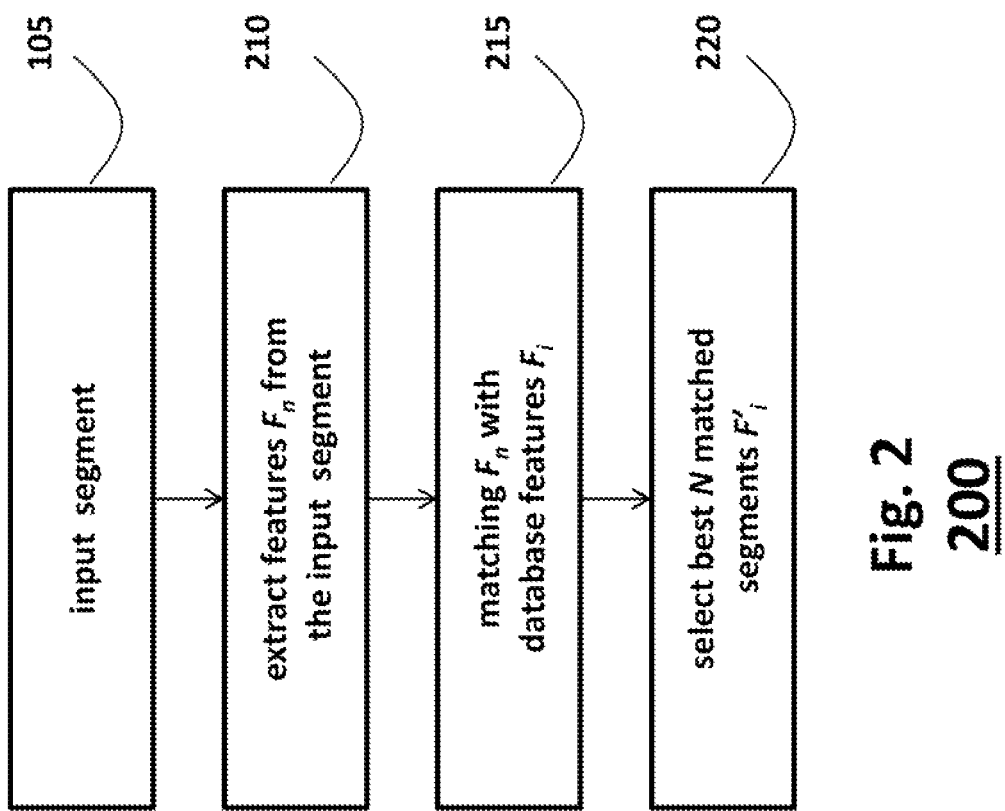
FIG. 2 is a flow diagram of a feature extraction and matching according to embodiments of the invention.

As shown in FIG. 2, input for the feature extraction 200 is the segment 105. The segment can correspond to a single image or picture, or a GOP or scene. Extracted set of input feature $F_n$ for each segment represent properties of that segment that enable clustering of segments into distinct categories. Our invention is not limited to one particular feature extraction method. However, several representative feature extraction schemes are described below. Without loss of generality, the feature extraction is described for single pictures or images.

Scale Invariant Feature Transform (SIFT)

In one embodiment, we use a scale invariant feature transform (SIFT), which transforms an image into a set of feature vectors or descriptors, each of which is invariant to image translation, scaling, and rotation, and partially invariant to illumination changes, and accurate for local geometric distortions. Key locations are defined as maxima and minima of the result of a difference of Gaussians functions applied in a scale space to a series of smoothed and resampled images. Low contrast candidate points and edge response points along an edge are discarded. Dominant orientations are assigned to localized keypoints. This ensures that the keypoints are more stable for matching and recognition. SIFT descriptors handle local affine distortion. The descriptors are obtained by considering pixels around a radius of a key location, blurring and resampling of local image orientation planes. Directly using, the SIFT descriptors can identify a large set of similar candidate segments.

A subset of the SIFT descriptors can also be used to handle image translation, while relaxing the invariance to changes in scale and rotation. Compared to conventional complete SIFT descriptors, our modified SIFT descriptors produces a smaller number of matched segments, which is desirable to reduce the number of matches when compared to conventional complete SIFT descriptors. Furthermore, the effect of the modified SIFT descriptors on the image translation reflects the fact that translated picture can be predictively and efficiently encoded using motion compensation techniques.

Other feature matching procedures, such as speeded up robust features (SURF), histogram of oriented gradient (HoG), local energy based shape histogram (LESH), or gradient location and orientation histogram (GLOH) can also be used.

The set of input features $F_n$ extracted for each picture are matched 215 with the sets of reference features $F_i$ associated with the reference segments 120 in the database to produce a set of scores. The segments in the database are sorted and arranged according to the features to enable a fast search during the matching. The optimal N matching segments with the largest are selected 220.

Feature Matching

After the set of input feature are extracted for the input segment, the feature matching 200 is performed by comparing the set of input features $F_n$ with the sets of reference features $F_i$ associated with the previously encoded reference segments 120.

The optimal matched segments with the largest are selected, and the 1$^{st}$ reduced reference set of segments 130 is denoted as $F'_i$. The size N can be pre-determined, and based on the processing capability of the subsequent down-selection of programs.

The feature matching process is tuned to determine similar segments in terms of high-level semantics, i.e., identifying segments that share similar scenes, objects, characters, colors, camera views, etc. In other words, images or video programs that are part of the same series, or share similar signal properties or characteristics, are selected as part of the feature matching process. Such candidates serve a suitable reference pictures for our inter-program encoding.

RD Cost Estimation

During the next phase of the process, the inter-program correlation is finer. Our invention estimates a rate-distortion (RD) cost for each candidate segment from $F'_i$ compared to the input segment 105.

In image and video coders, the RD cost is used to perform optimal mode decision and rate control. The RD cost jointly considers both the distortion of the reconstructed picture, and the rate or storage constraints according to $$J(m) = D(m) + \lambda R(m),$$

where in denotes encoding parameters to be optimized, D denotes the distortion, R denotes the rate used to encode, and J represents the RD cost, and $\lambda$ is a weighting parameter.

In one embodiment, m refers to the candidate reference pictures or segments, which are elements in $F'_i$. Formulated in this way, the optimal reference picture produces a smallest RD cost J. The RD cost is dependent on the coding standard that is used, e.g., JPEG, H.264/AVC or HEVC.

Figure 3:
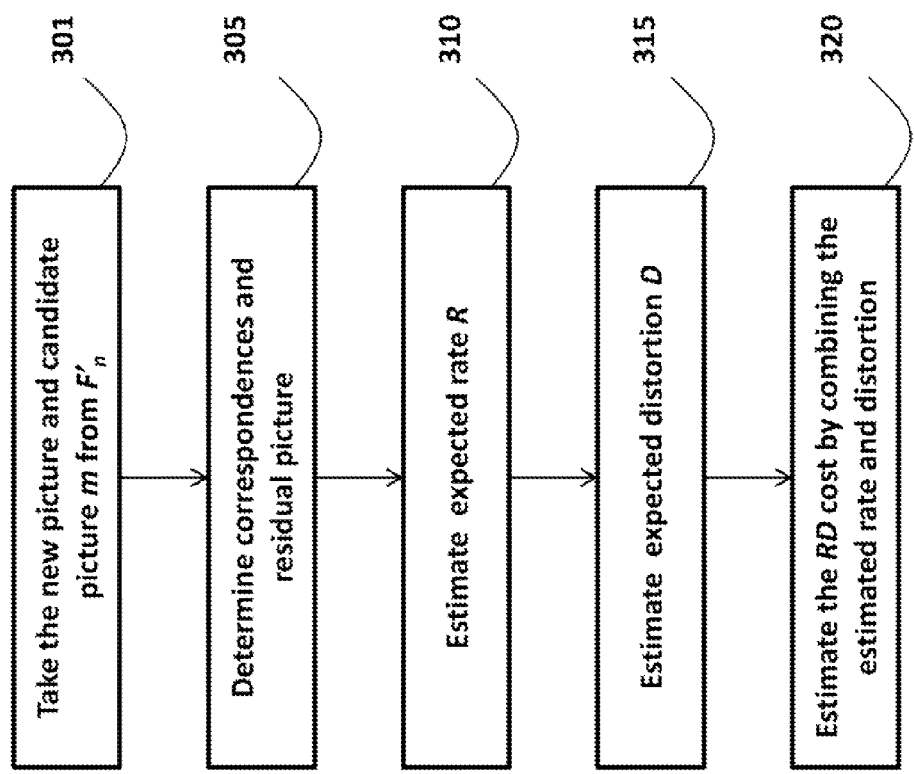
FIG. 3 is a flow diagram of rate-distortion estimation according to embodiments of the invention.

Therefore as shown in FIG. 3, correspondences between pictures are determined 305 in our system for each candidate picture in $F'_i$ 301. Any prior art method for determining correspondences can be used including processes that solve for optical flow, as well as conventional block-based motion or disparity estimation techniques. This process yields correspondence data as well as residual data.

The resulting correspondence data and residual picture are evaluated to estimate an expected rate and distortion. The principal of the evaluation is described below. The expected rate can be estimated 310 from the entropy of the correspondence data and the energy in the residual picture.

The expected distortion can be estimated 315 from the amount of high frequency components in the residual picture, because a higher frequency signal is likely to be truncated during the encoding process. More high frequency energy leads to a higher distortion.

The RD cost can be estimated 320 using the RD formulation, where the weighting parameter $\lambda$ balances between the expected distortion and the expected rate. In a practical system, the RD is tuned for the particular RD estimation process.

Based on the above principle, we describe different methods to estimate the RD cost including both low-complexity-low-accuracy and high-complexity-high-accuracy designs.

In one embodiment, low-complexity-low-accuracy, correspondences are not determined. In this way, the residual picture is obtained by directly subtracting the candidate reference picture from the new picture. This can be practical for some devices with very limited computing power. In another embodiment, global correspondence data is determined. That is, a single set of parameters is estimated for the entire picture which can include translation, rotation or other geometric parameters.

In another embodiment, correspondence data are determined on a per block basis, where the block size is a factor of the complexity. Larger block sizes require more processing. Typical block sizes are 64×64, 32×32, 16×16, 8×8, and 4×4.

To reduce complexity, the above procedure can be performed on downsampled pictures and in a hierarchical manner.

Consideration for Group of Pictures (GOPs)

In a practical encoding system, pictures are arranged in groups. It is preferred that the reference pictures selected from the stored video for a new GOP are temporally adjacent pictures. For this, we prefer a weighted evaluation. A larger weighting factor is for an anchor picture or intra-picture, or a scene cut picture in the GOP because these pictures have a relative large bit rate.

Offline Encoding Using Inter-Program Prediction

So far, we have assumed that the previously encoded images or videos are available and accessible when new images or videos are processed. However, this may not be practical is some applications. For example, the encoder can be resource constrained. In a networked application, previously encoded images or videos at a server may not always be accessible or useable at a client processor. Therefore, the new image or video is encoded, transmitted, and stored temporally, and processed offline.

For a collection of images or videos to be further compressed, the same principals of the invention apply.

Long-Term Reference Picture Selection

The methods described herein can also be used to obtain long-term reference pictures from a particular video. For example, an identified picture can be arranged as a long-term reference picture for a future scene in the same type of video program.

Although the invention has been described with reference to certain preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for encoding an input segment of an input video, comprising the steps of:
    extracting and storing, for each segment of previously encoded videos, a set of reference features;
    extracting, for the input segment, a set of input features;
    matching the set of input feature with each set of the reference features to produce a set of scores;
    selecting the reference segments having largest scores to produce a first reduced set of reference segments;
    estimating a rate-distortion cost for each reference segment in the first reduced set of reference segments;
    selecting the reference segments in the first reduced set of reference segments to produce a second reduced set of reference segments; and
    encoding the input segment based on second reduced set of reference segments, wherein the segment is a group of pictures (GOP), wherein the matching is performed in a weighted manner by providing a higher factor for a first picture in the GOP, and wherein the set of features are only invariant to translation, wherein the steps are performed in a processor.

2. The method in claim 1, wherein the set of features is obtained by a scale invariance feature transform (SIFT).

3. The method in claim 1, wherein the set of features is obtained by speeded up robust features (SURF).

4. The method in claim 1, wherein the set of features is obtained using a histogram of oriented gradient (HoG).

5. The method in claim 1, wherein the rate-distortion is estimated by performing motion estimation.

6. The method in claim 5, wherein the motion estimation always assumes a zero motion vector.

7. The method in claim 5, wherein the motion estimation is performed on downsampled segments.

8. The method in claim 5, wherein the motion estimation is performed globally at a picture level.

9. The method in claim 5, wherein the motion estimation is performed on a fixed sized blocks.

10. The method in claim 1, wherein the segment is a picture.

11. The method in claim 1, wherein the matching is performed in a weighted manner by providing a higher factor for a scene cut picture in the GOP.

12. The method in claim 1, wherein the rate-distortion cost is estimated from a motion vector and residual picture.

13. A method for encoding an input segment of an input video, comprising the steps of:
    extracting and storing, for each segment of previously encoded videos, a set of reference features;
    extracting, for the input segment, a set of input features;
    matching the set of input feature with each set of the reference features to produce a set of scores;
    selecting the reference segments having largest scores to produce a first reduced set of reference segments;
    estimating a rate-distortion cost for each reference segment in the first reduced set of reference segments;
    selecting the reference segments in the first reduced set of reference segments to produce a second reduced set of reference segments; and
    encoding the input segment based on second reduced set of reference segments, wherein the segment is a group of pictures (GOP), wherein the matching is performed in a weighted manner by providing a higher factor for a first picture in the GOP, wherein the steps are performed in a processor.

14. A method for encoding an input segment of an input video, comprising the steps of:
    extracting and storing, for each segment of previously encoded videos, a set of reference features;
    extracting, for the input segment, a set of input features;
    matching the set of input feature with each set of the reference features to produce a set of scores;
    selecting the reference segments having largest scores to produce a first reduced set of reference segments;
    estimating a rate-distortion cost for each reference segment in the first reduced set of reference segments;
    selecting the reference segments in the first reduced set of reference segments to produce a second reduced set of reference segments; and
    encoding the input segment based on second reduced set of reference segments, wherein the segment is a group of pictures (GOP), wherein the matching is performed in a weighted manner by providing a higher factor for a scene cut picture in the GOP, wherein the steps are performed in a processor.

* * * * *